Figure 1:
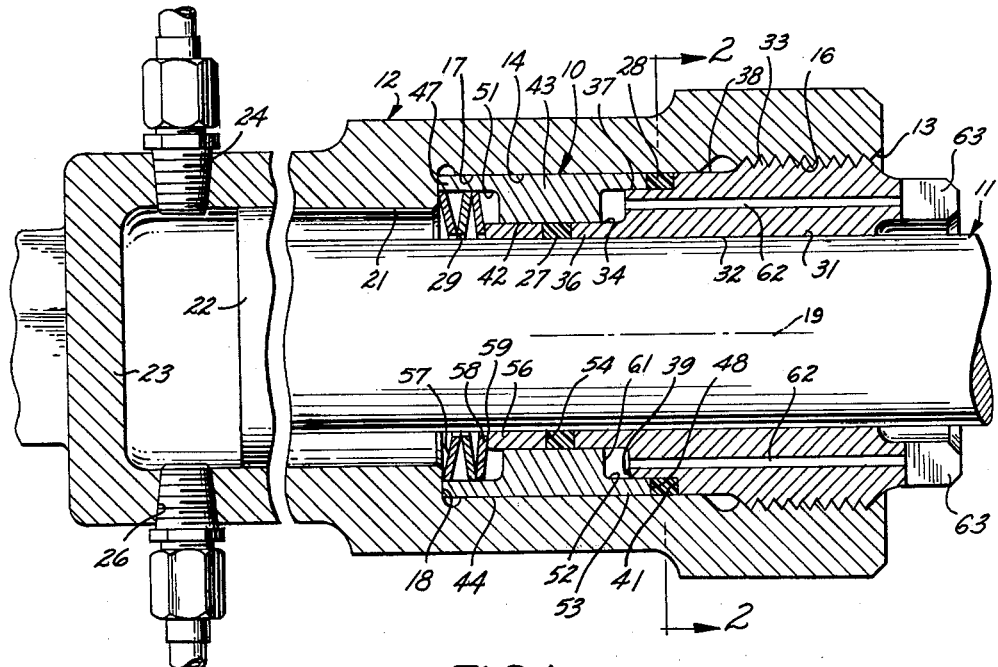

April 21, 1964   G. A. KENDALL   3,129,948
PACKING GLAND
Filed Nov. 2, 1961

INVENTOR.
GILES A. KENDALL
BY R. E. Geaingue
ATTORNEY

United States Patent Office 3,129,948
Patented Apr. 21, 1964

3,129,948
PACKING GLAND
Giles A. Kendall, Van Nuys, Calif., assignor to Menasco Manufacturing Company, Burbank, Calif., a corporation of California
Filed Nov. 2, 1961, Ser. No. 149,627
17 Claims. (Cl. 277—27)

This invention relates to a packing gland and more particularly to a means for sealing a movable rod relative to a vessel adapted to contain a gas or liquid under pressure.

The packing gland essentially comprises a spring loaded dynamic seal and an unsupported area static seal for sealing a rod movable relative to a vessel adapted to contain a fluid under pressure so as to prevent leakage of stored gas or liquid from the vessel.

This packing gland is particularly effective for sealing a movable rod in a vessel containing highly volatile and dangerous fluids in which zero leakage is highly desirable.

Therefore, an object of this invention is to provide a new and improved packing gland for sealing a movable rod relative to a vessel for preventing leakage of the fluid by providing both dynamic and static seals subjective to the pressure of the pressurized fluid for improved sealing of the rod relative to the vessel.

Another object of this invention is to provide a new and improved packing gland in which the friction of the dynamic seal is relatively low.

A further object of this invention is to provide a new and improved packing gland which has a very long life characteristic in both the inactive and active regime of the rod relative to the vessel.

Yet another object of this invention is to provide an improved packing gland in which both the static and dynamic seals may be easily and readily replaced without removing the rod from the cylinder.

A further object of this invention is to provide a new and improved packing gland which is economical to manufacture and is capable of mass production.

A general object of this invention is to provide a new and improved packing gland of the character described which overcomes disadvantages of prior means and methods heretofore intended to accomplish generally similar purposes.

These and other objects of this invention will be more apparent from the following detailed description, drawings and appended claims.

Figure 2:
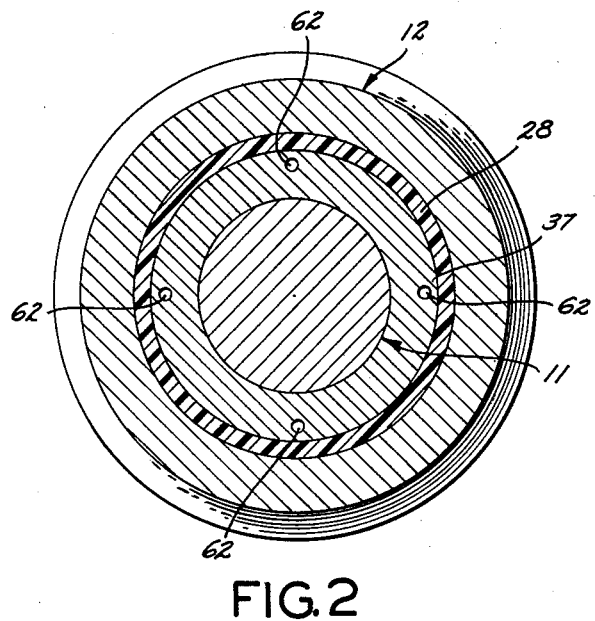

In the drawings:

FIGURE 1 is a vertical, cross-sectional view as taken substantially along the longitudinal centerline of a vessel adapted to contain fluid under pressure; and FIGURE 2 is a vertical, cross-sectional view as taken substantially along the line 2—2 of FIGURE 1.

Referring in detail to the drawings, there is shown by way of illustration, but not of limitation, a packing gland designed and constructed in accordance with this invention and generally referred to by the numeral 10. The packing gland 10 is herein illustrated as adapted to seal a rod 11 which is movable relative to a vessel 12 adapted to contain a gas or liquid under pressure, the rod herein being illustrated as a piston rod and the vessel 12 as a cylinder having an open end 13 in which the piston rod 11 is reciprocable.

The cylinder 12 is provided with a counterbore 14 having an internally threaded portion 16 adjacent to the open end 13 and an inner portion 17 which is cylindrical and defines an inwardly extending annular shoulder 18. The bore 14 is substantially coaxial to the longitudinal axis 19 of the piston rod 11 and to a bore 21 comprising the interior of the cylinder 12 which is adapted to receive a gas or liquid under pressure. As an example, the piston rod 11 is shown as having a piston 22 reciprocable in the bore 21 and the cylinder 12 is shown as having a closed end 23 opposed to the open end 13 and ports 24 and 26 for admitting gas or liquid into the chamber formed by the bore 21 and effective against the piston 22 for operation thereof.

The packing gland 10 generally comprises a dynamic seal 27 and a static seal 28, both subject to pressure of the fluid under pressure in the bore 21 and seal 27 being further subject to an axial force of a spring means 29, for sealing of the gland member 10 relative to the bore 14 and to the piston rod 11.

A gland nut 31 is provided with an inner axial bore 32 having a sliding fit with the rod 11 and a stepped exterior. The stepped exterior includes external threads 33 on an outer portion thereof threadedly engaged with the threads 16 of the bore 14, a circumferentially reduced portion 34 at its opposite end 36 and a pair of intermediate circumferentially reduced portions 37 and 38 defining annular shoulders 39 and 41, respectively. The circumferentially reduced portion 38 slidingly fits in the cylindrical portion of the bore 14.

The circumferentially reduced portion 34 slidingly fits an axial bore 42 of a tubular adapted member 43 having an outer circumference 44 slidingly fitting the inner cylindrical portion 17 of the bore 14, the bore 42 being circumferentially spaced from the outer diameter of the rod 11 so as to form an axial space between the tubular member 43 and the rod 11. The tubular member 43 is movable in the cylindrical portion 17 of the bore 14 and includes an inner end 47 abuttable with the annular shoulder 18 of the bore 14 and an outer end 48 adjacent to the shoulder 41 but axially spaced therefrom. The end 48, the annular shoulder 41, the bore portion 17, and the circumferentially reduced cylindrical portion 37 of the gland nut 31 form an annular chamber in which the static sealing means 28 resides.

The sealing means 28 comprises an annular member of resilient, compressible material, such as rubber, neoprene, Teflon, asbestos impregnated with graphite or Teflon, soft metals such as lead, or the equivalent. The ring 28 may be formed with any desired effective cross-sectional configuration, such as the rectangular configuration illustrated herein or optionally of an O-ring, quadrant ring, or the like.

The sealing means 28 comprises a static seal responsive to movement of the sleeve member 43 which is subjective to the pressure of the fluid under pressure in the chamber defined by the bore 21, the sleeve member 43 being axially movable towards the annular shoulder 41 to axially compress the sealing ring 28 and thereby radially expand the sealing ring to seal the gland nut 31 relative to the bore 14.

The annular sleeve member 43 is circumferentially relieved, as by a counterbore 51 adjacent to its inner end and a similar counterbore 52 adjacent to its outer end. The counterbore 52 forms an annular outer portion 53 of reduced area which is slidable relative to the circumferentially reduced portion 37 and terminates in end 48 comprising one side of the annular chamber in which the sealing means 28 resides.

The dynamic sealing ring 27 resides within the annular space between member 43 and rod 11 and adjacent to the exterior annular surface of the end 36 of the gland nut 31. The seal 27 is compressed between the end 36 and an outer end 54 of a movable sleeve 56 disposed within said annular space for sealing the annular space surrounding the rod 11 and thereby sealing the rod during its movement relative to the packing gland.

The spring means 29 is illustrated herein as of a Belleville spring washer type having a plurality of dished washers, the innermost washer, designated as by the numeral 57, being engaged with the annular shoulder 18 whereas the outermost washer, designated by the numeral 58, is engaged with the inner end 59 of the movable sleeve 56 so as to bias the end 54 of the sleeve into contact with the sealing ring 27.

In addition to the axial force of the spring means 29 against the sleeve 56 to compress the sealing ring 27, the annular area of the sleeve 56, between the outer diameter thereof and the outer diameter of the rod 11, is subjected to the pressure of the fluid under pressure within the vessel 12. By the combined action of the spring means 29 and the fluid pressure in the bore 21, the dynamic seal 27 is pressurized to a value greater than that of the pressure in the cavity of the interior of the vessel 12; thus, the seal 27 tends to flow into the cavity 21 and an effective barrier is formed against flow of fluid from the cavity 21 past the seal 27 to the outside of the cylinder 12.

An axial force is developed on the tubular member 43 by the action of pressure in the cavity 21 working on the projected annular area defined by the diameter portion 17 of bore 14 minus the inner diameter 42 of the tubular member 43. This force is received by the projected area of the static seal 28. As the projected area of the static seal 28 is less than the projected area of the sleeve or tubular member 43, the compressive pressure in the static seal 28 is greater than the pressure in the cavity 21 and the seal tends to flow into the cavity 21. This action produces an effective barrier against flow of gas or liquid from the vessel 21 past the sealing ring 28.

An annular chamber is defined by the counterbore 52, the circumferential surface 34, the shoulder 39, and an opposed annular shoulder 61. The chamber communicates by one or more axial passages 62 to the outside of the cylinder 12 to vent the annular chamber and prevent accumulation of gas or fluid in the chamber (formed by the gland nut and the tubular member 43) which would reduce the effectiveness of the static seal 28.

The gland nut 31 is preferably provided with a pair of spanner wrench slots 63 so that the nut 31 may be rotated relative to the cylinder 12 for installation or removal thereof. The gland nut 31 is removable for replacement of the sealing rings 27 and 28 without necessitating removal of the piston rod 11. The nut 31 may be backed off so as to disengage its external threads 33 with the internal threads 16 and expose the sealing members 27 and 28. This is effective in any installation in which seal rings 27 and 28 are slippable over the piston rod 11 from its outer end. In installation where this is not possible seal rings 27 and 28 may be of the helical wrap type.

While there is herein shown and described what is conceived to be the most practical and preferred embodiment of this invention, it is recognized that departures may be made therefrom within the scope of this invention which is not limited to the details disclosed herein but is to be accorded the full scope of the claims so as to embrace any and all equivalent devices.

What is claimed as new and desired to secure by Letters Patent is:

1. A packing gland for sealing a movable rod relative to a cylinder adapted to contain fluid under pressure, comprising: means defining a counterbore in said vessel adjacent to an open end thereof and communicating between the interior of said vessel and said open end; an annular member fitting said counterbore and bottomed in said counterbore and defining an annular space surrounding said movable rod; a gland nut retaining said annular member in said counterbore, said gland nut having a threaded connection to said cylinder and a circumferentially reduced end fitting in said annular space; a first annular sealing ring of compressible material in said annular space and adjacent to said reduced end of said gland nut; an annular sleeve member movable in said annular space and having one end bearing against said annular seal ring; spring means in said counterbore and biasing said one end of said annular sleeve to bear against said first annular sealing ring, said first sealing ring being responsive to addition of said spring means to the pressure applied by the fluid under pressure against the differential area between the outer area of said sleeve and the outer diameter of said rod for sealing said annular space; and second sealing means for sealing said gland nut to said counterbore of said cylinder.

2. A packing gland as defined in claim 1, wherein said second sealing means is annular and radially expandable and is sandwiched between a reduced annular area of said gland nut and said annular member, said annular member being movable in said counterbore in response to the fluid under pressure in said cylinder acting thereagainst for compressing said second sealing means to expansively seal said gland nut to said counterbore of said vessel.

3. A packing gland as defined in claim 2, including an annular chamber between said movable annular member and said gland nut; and means providing a vent passageway communicating between said annular chamber and the exterior of said vessel.

4. A packing gland for sealing a rod movable relative to a vessel adapted to contain fluid under pressure, comprising: means defining a bore in said vessel adjacent to an open end thereof, said bore being substantially coaxial to the longitudinal axis of said rod and communicating between the interior of said vessel and said open end, said bore defining an outwardly extending annular shoulder at its inner end and being internally threaded at its outer end adjacent to said open end and having a cylindrical portion therebetween; a tubular member fitting in said bore and having one end adjacent to said annular shoulder, said tubular member having an inner diameter defining an annular space surrounding said movable rod; an annular gland nut having an outer externally threaded portion engaged with said internal threads of said bore and a cylindrical intermediate portion fitting in said cylindrical portion of said bore and a circumferentially reduced end fitting in said annular space; a first annular sealing ring of compressible material in said annular space and adjacent to said reduced end of said gland nut; an annular sleeve member in said annular space, said sleeve member having one end bearing against said first sealing ring and an opposite end defining an effective pressure area subjected to pressure of said fluid under pressure; and compression spring means having one end bearing against said opposite end of said sleeve member and an opposite end bearing against said annular shoulder for biasing said sleeve member in abutment with said first sealing ring, said sealing ring being responsive to movement of said sleeve member when subjected to said fluid pressure and said spring means for expanding radially to seal said annular space.

5. A packing gland as defined in claim 4, including a second annular sealing ring of resilient, compressible material sandwiched between an outer, reduced annular area of said tubular member and said gland nut and wherein one end of said tubular member is subjected to the pressure of said fluid for movement in a direction to axially compress said second sealing ring so as to expand in a radial direction for sealing said gland nut relative to said bore.

6. A packing gland as defined in claim 4, including an annular chamber between said movable tubular member and said gland nut, said annular chamber being defined by a counterbore in the opposite end of said tubular member and a portion of said circumferentially reduced end on said gland nut fitting in said counterbore, said counterbore and circumferentially reduced end portion defining annular shoulders on said tubular member and said gland nut, respectively, one being movable relative to the other in response to movement of said tubular member; and means providing a vent passageway communicating between said annular chamber and said open end of said vessel for venting said annular chamber.

7. A packing gland as defined in claim 4, including a counterbore in said one end of said movable tubular member, the outer diameter of said counterbore being substantially larger than the inner diameter of said annular shoulder; and said spring means comprising a plurality of Belleville washers in said counterbore and having one end engaging said annular shoulder and an opposite end effectively engaging said opposite end of said sleeve member.

8. A packing gland for sealing a rod movable relative to an open end of a vessel adapted to contain fluid under pressure, comprising: means defining a bore in said vessel adjacent to the open end thereof, substantially coaxial to the longitudinal axis of said rod and communicating between the interior of said vessel and said open end; an annular gland nut fixed in an outer end of said bore, adjacent to said open end and having a circumferentially reduced inner end; a tubular member in an inner portion of said bore and movable in said inner portion and having an inner diameter defining an annular space surrounding said movable rod; first annular sealing means in said annular space; an annular sleeve member in said annular space and having one annular area adjacent said sealing means and another annular area subjected to the pressure of the fluid under pressure in said cylinder; said reduced inner end of said gland nut being located in said space on the side of said sealing means opposite of said sleeve member spring means for biasing said sleeve member in a direction for compressing said first annular sealing ring against said reduced end of said gland nut, said pressure area of said sleeve member and said spring means compressing said annular sealing ring so as to seal said gland nut relative to said movable rod.

9. A packing gland as defined in claim 8, including second annular sealing means adjacent said bore and sandwiched between outer, reduced annular areas of said tubular member and said gland nut, said tubular member having an effective pressure area responsive to said fluid pressure larger than the annular area of said second sealing means for compressing said second sealing means so as to seal said gland nut relative to said bore.

10. A packing gland as defined in claim 8, including an annular chamber between said movable tubular member and said gland nut, said annular chamber being defined by a counterbore in one end of said tubular member and a portion of said circumferentially reduced end on said gland nut fitting in said counterbore, said counterbore and said circumferentially reduced end portion defining annular shoulders on said tubular member and said gland nut, respectively, one movable relative to the other in response to movement of said tubular member; and means providing a vent passageway communicating between said annular chamber and said open end of said vessel for venting said annular chamber.

11. A packing gland as defined in claim 8, including an outwardly extending annular shoulder at the inner end of said bore, a counterbore in the end of said movable tubular member located adjacent said annular shoulder, the outer diameter of said counterbore being substantially larger than the inner diameter of said annular shoulder; said spring means comprising a plurality of Belleville washers in said counterbore and having one end engaging said annular shoulder and an opposite end engaging said other annular area of said sleeve.

12. In a pressure sealing means for use between a pair of relatively reciprocating coaxial cylindrical members, one of which comprises:
a cylinder containing a fluid under pressure,
a gland member fixed to one of said members and closing the radial space between said members,
a static seal located adjacent said one member for sealing against fluid leakage between said gland member and said one member,
first means operative upon said static seal and responsive to said fluid pressure for producing a unit sealing pressure in said static seal exceeding that of said fluid pressure,
a dynamic seal located adjacent said other member for sealing against fluid leakage between said gland member and said other member, and
second means operative upon said dynamic seal and including spring means operative independently of said fluid pressure for producing a unit pressure therein exceeding that of said fluid pressure,
said dynamic seal being confined adjacent said other member by said first means during application of pressure to said dynamic seal by said second means.

13. In a pressure sealing means as defined in claim 12 wherein said first means comprises
a movable tubular member having a first area operative upon said static seal and a second area larger than said first area responsive to said fluid pressure, the inner diameter of said tubular member being larger than the outside diameter of said other member to provide a space therebetween containing said dynamic seal.

14. In a pressure sealing means as defined in claim 13, wherein said second means comprises
a sleeve member slidable between said tubular means and said other member, said sleeve member having a first portion operative upon said dynamic seal and a second portion responsive to said fluid pressure, said spring means being also operative upon said second portion.

15. In a pressure sealing means as defined in claim 14 wherein first and second portions are of equal area so that the unit pressure in said second seal always exceeds that of said fluid pressure by the amount produced by said spring means.

16. In a sealing means for use between a cylinder containing a pressure under fluid and a movable rod extending into one end of said cylinder,
a gland nut fixed in an end of said cylinder and closing the radial space between cylinder and said rod,
said gland nut having a first annular shoulder adjacent the inner surface of said cylinder and facing toward fluid within said cylinder,
first sealing means located adjacent said shoulder and positioned against the inner surface of said cylinder by said nut,
movable means slidable along said inner surface and having a first portion larger than that of said annular shoulder subject to fluid pressure within said cylinder,
said movable means having a second portion of substantially the same size as said annular shoulder and engageable with said first sealing means opposite said first shoulder for imparting thereto a unit pressure exceeding that of the fluid within said cylinder in order to force said first sealing means into static sealing engagement with said inner surface of said cylinder,
a second annular shoulder on said gland nut adjacent said rod and facing toward the fluid within said cylinder, second sealing means located adjacent said second shoulder and said rod,
a sleeve member slidable on said rod and having one end engaging said second sealing member opposite said second shoulder, said second sealing means being confined against movement away from said rod by said movable means and the other end of said sleeve member being subject to the fluid pressure within said cylinder, and
spring means engaging the said other end of said sleeve member and operative together with the pressure of said fluid to force said second sealing means into dynamic sealing engagement with said rod.

17. In a pressure sealing means as defined in claim 16, wherein the operative areas of said ends of said sleeve member are equal.

References Cited in the file of this patent
UNITED STATES PATENTS

| | | |
|---|---|---|
| 1,299,409 | Schneider | Apr. 1, 1919 |
| 2,481,121 | Kasten | Sept. 6, 1949 |
| 2,670,973 | Ginther et al. | Mar. 2, 1954 |
| 2,957,712 | Farmer | Oct. 25, 1960 |